United States Patent [19]

Sasaki et al.

[11] Patent Number: 4,747,563
[45] Date of Patent: May 31, 1988

[54] TAPE CASSETTE REEL

[75] Inventors: Shin Sasaki; Masahiro Makino, both of Miyagi, Japan

[73] Assignee: Sony Corporation, Tokyo, Japan

[21] Appl. No.: 814,389

[22] Filed: Dec. 30, 1985

[30] Foreign Application Priority Data

Jan. 19, 1985 [JP] Japan ............................... 60-5577[U]

[51] Int. Cl.$^4$ ............................................. B65H 75/18
[52] U.S. Cl. ..................................... 242/199; 242/71.8
[58] Field of Search ....................... 242/197, 71.8, 199, 242/200, 68.6, 77, 116, 118.6

[56] References Cited

U.S. PATENT DOCUMENTS

| | | | |
|---|---|---|---|
| 1,581,279 | 4/1926 | Marvin et al. | 242/68.6 |
| 4,176,804 | 12/1979 | Nemoto et al. | 242/71.8 X |
| 4,203,564 | 5/1980 | Nemoto | 242/71.8 |
| 4,254,919 | 3/1981 | Moodie | 242/71.8 |
| 4,404,749 | 9/1983 | Nakagawa | 242/71.8 |
| 4,449,677 | 5/1984 | Ohta et al. | 242/199 |
| 4,452,404 | 6/1984 | Gelardi et al. | 242/71.8 |
| 4,564,156 | 1/1986 | Cybulski | 242/197 |

FOREIGN PATENT DOCUMENTS

| | | |
|---|---|---|
| 0045085 | 7/1981 | European Pat. Off. . |
| 2391144 | 12/1978 | France . |
| 59-112472 | 10/1984 | Japan . |
| 1576692 | 10/1980 | United Kingdom . |

Primary Examiner—John Petrakes
Assistant Examiner—Joseph J. Hail, III
Attorney, Agent, or Firm—Ronald P. Kananen

[57] ABSTRACT

A reel flange for a tape reel in a tape recording system which has an annularly-shaped projecting portion which merges into a recessed annularly-shaped control portion. A plurality of inwardly-directed rib members extend inwardly from the projecting portion into the recessed central portion to aid in the alignment of the reel flanges when stacked during manufacture. Openings in the recessed control portion receive mating pins located on a cylindrical projecting portion intermediate the flanges of the reel to secure the flange to the projection portion. The flange further defines a stacking-pin receiving opening with an alignment lug. The thickness of the projecting portion of the reel flange may also decrease with increasing radial distance from its center.

6 Claims, 3 Drawing Sheets

TAPE CASSETTE REEL

BACKGROUND OF THE INVENTION

This invention relates to an improved reel for a tape cassette. More particularly, this invention relates to an upper reel flange for a tape cassette having a plurality of ribs in a central recessed portion to maintain vertical alignment of the flanges during stacking. Still more particularly, this invention relates to such an improved upper reel flange for a tape cassette wherein the thickness of the reel flange decreases with an increasing radius from a center recessed portion of the reel flange. In addition, this invention relates to a method of stacking such reel flanges in a manufacturing process to maintain true alignment for transfer by a vacuum mechanism.

A number of tape cassettes are known for use in a conventional video tape recorder (VTR). In general, such cassettes include an opening extending along one side of the cassette with a cutout in the bottom of the cassette housing communicating with that opening. A plurality of reels are rotatably mounted within the cassette for receiving magnetic tapes for transfer between the reels. A magnetic tape is guided across the opening so that, when the tape cassette is loaded into a tape cassette holder of the VTR, tape loading pins mounted on a loading ring are inserted into the cutout of the cassette housing behind the tape run. Rotation of the loading ring causes the tape loading pins to engage the tape in the run between the reels, to withdraw the tape from the cassette housing and to wrap the withdrawn tape around the peripheral surface of the guide drum of the VTR. A conventional tape cassette is usually provided with a lid which is movable on the cassette housing between a closed position covering the opening of the housing and an open position to which the lid is moved when the cassette is placed in the cassette holder.

Examples of such cassette mechanisms are shown in U.S. Pat. Nos. 4,405,962; 4,418,373; 4,445,154; 4,449,677; and 4,482,104, all assigned to the assignee of this application. As there shown, the supply reel and the take-up reel each includes a lower reel flange and an upper reel flange. The lower reel flange includes teeth at its periphery to prevent rotation of the reel when the cassette is not in use and to prevent rotation of the supply reel in a manner inconsistent with the take-up reel. The upper reel flanges of each reel generally include a structure for mating with and securing the upper reel flange at its central portion to a coaxial cylindrical projecting portion disposed between the upper reel flange and the lower reel flange. The present invention addresses a problem in manufacturing such cassettes which arises in maintaining the upper reel flange in an aligned stack for transfer by a vacuum mechanism during the manufacturing process.

Accordingly, it is overall object of the present invention to provide an improvement in a tape cassette, particularly of the type used with 8 mm video tape recorders, by providing the upper reel flange with a plurality of ribs formed in the recessed central portion of the upper reel flange so that the cassette reel may be maintained in an aligned fashion in a stack for transfer by a vacuum mechanism.

During the manufacturing process, it is desired to provide a plurality of upper reel flanges in a substantially true vertical alignment on a stacking pin so that a surface of the upper reel flange may be contacted by a vacuum mechanism to transfer the upper reel flange to a subassembly of the video cassette to be secured therein. The problem has arisen in the art in that when the opening in the upper reel flange is maintained at a relatively large dimension compared to the stacking pin to permit easy insertion and withdrawal of the flange over the stacking pin, the opposite sides of the central recessed portions tend to nest one within the other, thus skewing the vertical alignment of the stack. When a stack of upper reel flanges is thus skewed, difficulties may be encountered in grasping the upper reel flange with a vacuum attachment primarily because of the angle at which an extending annular surface of the upper reel flange lies relative to the vacuum attachment.

Accordingly, it is a primary object of this invention to provide an upper reel flange for a video tape cassette which is structured to maintain the vertical and horizontal alignment of the upper cassette reel flange during manufacture and to facilitate its transfer from a stack to a subassembly.

When stacks of upper reel flanges are skewed, a secondary problem may arise. Since such upper reel flanges are generally made from a clear plastic material, such radial movement of one reel flange relative to another in a stack may cause scratching and abrasion which appear to be untidy and, in a worst case, may abraid the shoulder between the recessed central portion and the laterally extending annular flange of an upper reel flange. Such an abrasion of the shoulder may possibly affect the true operation of the flange. Accordingly, it is a secondary object of this invention to overcome the radial slippage between adjacent upper reel flanges when stacked during the manufacturing process by maintaining their true vertical and horizontal alignment during a phase of the manufacturing process.

SUMMARY OF THE INVENTION

Directed to achieving the foregoing objects of the invention and overcoming the difficulties in the prior art manufacturing process, the invention comprises an upper reel flange for a video tape recorder. The upper reel flange includes a central recessed portion having an axially directed central opening therein, a plurality of axially directed connecting openings, and a plurality of ribs spaced about the recessed portion directed inwardly into the central recessed portion. When the improved upper reel flanges are stacked horizontally over an alignment pin extending through a stacking pin receiving opening adjacent the recessed portion, the ribs of one upper reel flange nest adjacent the ribs of an adjacent upper reel flange to maintain the upper reel flanges in substantial alignment on the stacking pin.

A second feature of the invention relates to a structure of a horizontally-extending annular portion of an upper reel flange. According to the second feature of the invention, the thickness of the annular extending portion of the flange decreases slightly with increasing distance from the axis of the upper reel flange and thus from the shoulder connecting the central recessed portion to the annular extending portion so that when the flanges are stacked, a space is provided between them to facilitate their vacuum withdrawal during manufacturing.

A method of stacking and transferring such reel flanges, structured according to the invention, is also disclosed.

DETAILED DESCRIPTION OF THE PREFERRED EMBODIMENT

Figure 1:
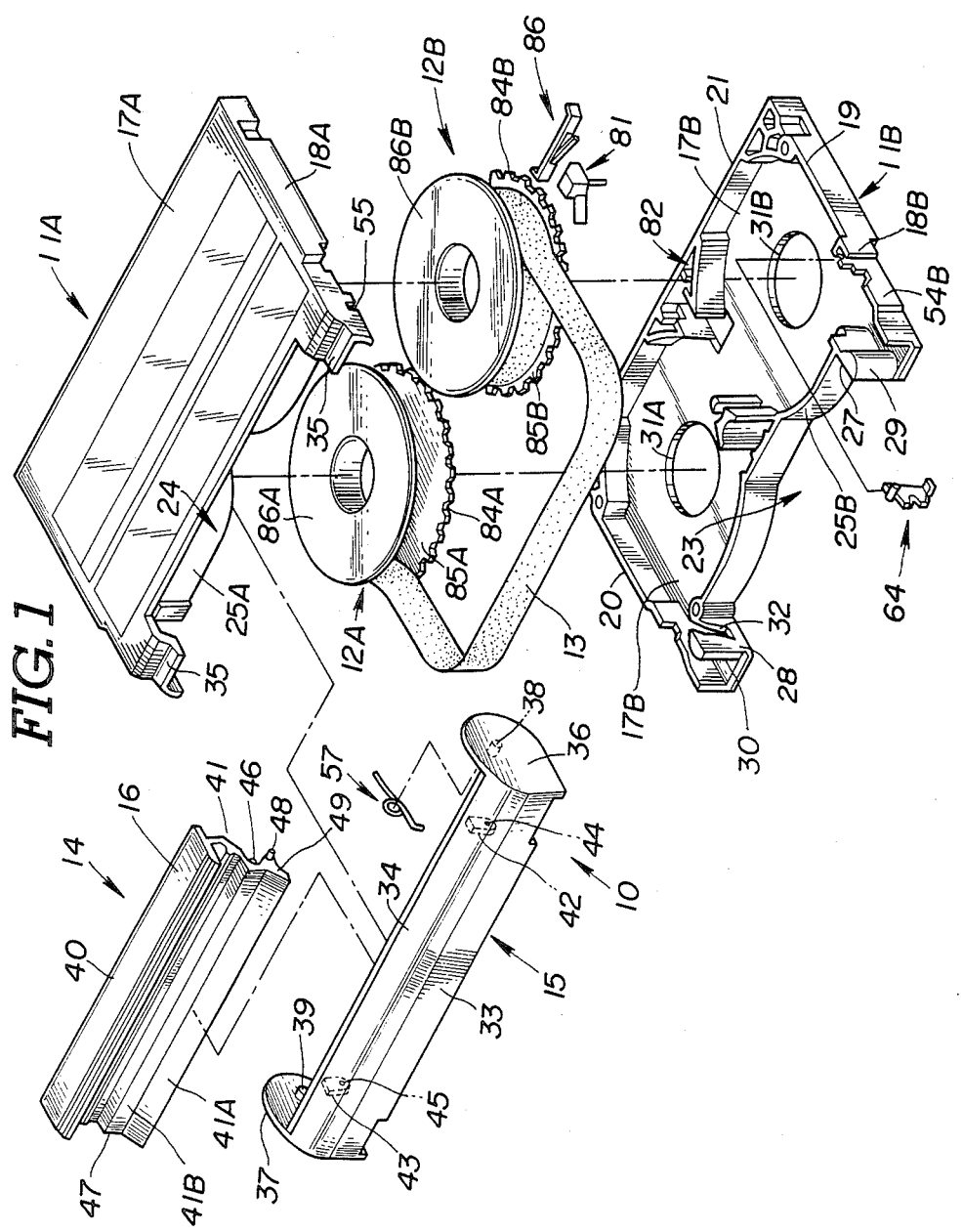
FIG. 1 is an exploded perspective view showing the various major components of a video tape cassette in which the upper reel flange according to the invention is used.

FIG. 1 shows a tape cassette 10 of a type in which the invention is used and is provided primarily for background in understanding the use of the upper reel flange according to the invention. Reference may be made to copending application Ser. No. 651,452, filed Sept. 17, 1984, and assigned to the assignee of the instant invention, for further details concerning FIG. 1. As is apparent, the tape cassette 10 is of a type intended for use in an 8-mm video tape recorder (VTR).

The cassette 10 comprises a substantially rectangular cassette housing 11 composed of upper and lower housing portions 11A and 11B, a pair of reels generally indicated by reference numerals 12A and 12B rotatably contained in the housing 11 in a side-by-side relation and having magnetic tape 13 wound on the reels. The main aspects of the invention according to this application relate to the upper reel flanges of the reels 12A and 12B, as will be seen from a discussion of FIGS. 4–7. The cassette 10 includes a back lid assembly 14 and a front lid assembly 15. The lid assembly 14 is pivotally mounted on the housing 11 for movement between open and closed positions. In the open position of the lid assembly 14, a run of the tape between reels 12A and 12B is exposed for withdrawal from the housing 11 while, in the closed position, the lid assembly 14 covers or encloses the tape run both at the front and back of the tape run.

The upper and lower housing portions 11A and 11B have substantially rectangular top and bottom walls 17A and 17B, respectively, and flanges 18A and 18B extend along the margins of the top and bottom walls 17A and 17B, respectively, and engage each other at a plane of separation which is substantially parallel with the walls 17A and 17B when the housing portions 11A and 11B are brought together vertically, that is, at a direction normal to a plane of separation for defining a peripheral structure of the housing. The peripheral structure of the housing includes end walls 19 and 20 at the opposite relatively short end of the housing 11 and a back or side wall 21 along one of the relatively long sides of the rectangular housing. At the front or other long side of the housing, an opening between the back lid assembly 14 and the front lid assembly 15 is defined which extends substantially from one to the other of the end walls 19 and 20. The bottom wall 17B has an approximately trapezoidal cutout 23 communicating with the tape run opening. Thus, the ends of the cutout 23 are spaced inwardly from the end walls 19 and 20.

A substantially rectangular cutout 24 which is approximately as wide as the cutout 23 is formed in the forward portion of the top wall 17A and has a depth smaller than the depth of the cutout 23 as measured at the middle of the housing 11. A flange 25A with curving portions depends from the top wall 17A behind the cutout 24 and mates with a flange 25B having similarly curving portions directed upwardly from the bottom wall 17B along the back edge of the cutout 23. When the housing portions 11A and 11B are brought vertically together, the flanges 25A and 25B on the upper and lower housings 11A and 11B mate to define a partition by which a space containing the reels 12A and 12B within the housing is isolated from the opening 22 and the cutout 23.

At the opposite ends of the cutout 23, the housing portion 11B is formed or molded with upstanding walls 27 and 28 directed forwardly from the opposite ends of the flange 25B. The walls 27 and 28 are higher than the flange 25B so as to extend freely from the bottom wall 17B to the top wall 17A in the assembled cassette 10. The outwardly directed surfaces of the walls 27 and 28 which are spaced from the end walls 19 and 20 are formed with rounded or semi-cylindrical surface portions 29 and 30 acting as tape guides at the opposite ends of the tape opening. The bottom wall 17B has laterally spaced apart circular apertures 31A and 31B in which hubs of reels 12A and 12B, respectively are loosely received for rotatably locating the reels in the cassette 10 and through which drive shafts or spindles (not shown) of a VTR can conventionally engage the hubs of the reels 12A and 12B when the cassette 10 is operatively positioned in the VTR.

The tape 13 which extends between the reels 12A and 12B is directed forwardly from the reels at about guides 29 and 30 so as to establish a tape run extending across the opening. The walls 27 and 28 include curving guide grooves 32 extending approximately vertically in their inwardly directed surfaces for controlling pivoting movement of an inner lid member relative to the outer lid member 15 during movement of the latter between opened and closed positions of the lid assembly 14.

The outer lid member 15 includes a front wall portion 33 which is laterally elongated to have a length substantially equal to the distance between the end walls 19 and 20 of the housing 11, a shallow top wall portion 34 extending from the upper edge of the front wall portion and having a width smaller than the depth of the cutout 24 in the top wall 17A so as to be engageable over depressed, shelf-like extensions 35 of the top wall 17A at the opposite ends of the cutout 24.

Ears 36 and 37 directed rearwardly from the opposite ends of the front and top wall portions 33 and 34 have inwardly directed pivot turns or trunians 38, respectively, for pivotally mounting the outer lid member on the end walls 19 and 20. When thus pivotally connected with the housing 11, the outer lid member 15, in its closed position, has its wall portion 33 covering the front surface of the tape run, while the top portion 34 of the lid member 15 extends over the tape run. The inner lid member 14 has a length substantially equal to that of the cutout 24 and includes an elongated head portion 40 dimensioned to span the gap between the longitudinal edge of the cutout 24 and the top wall portion 34 of the outer lid member 15 in the closed position of the latter. The inner lid member 16 includes an angled skirt portion 41 extending generally downwardly and forwardly from the head portion 40 along the length of the latter. The skirt portion 41 is dimensioned so that when the lid assembly 14 is in its closed position, the skirt portion 41 extends downwardly behind the tape run with the lower edge part 41A of the skirt portion 41 substantially abutting the lower edge portion of the front wall portion 33 under the tape run. Thus, the tape run between the reels 12A and 12B is substantially enclosed and protected within a space defined between the lid members 15 and 16 in the closed position of the assembly 14 so that there is no possibility of dust accumulating on or other injurious contact with the back surface of the tape run through the cutout 23.

Mounting lugs 42 and 43 are preferably mounted integrally with the top wall portion 34 of the outer lid member 15 at laterally spaced locations corresponding to the ends of the inner lid member 16 and are formed with openings 44 and 45 for pivotally receiving aligned pins 46 and 47 extending from opposite ends of an intermediate part 41B of the skirt portion 41. The lug members 42 and 43 are desirably laterally resilient while the end surfaces of the pivot pins 46 and 47 are oblique or slanted to permit such pivot pins to snap into the respective holes 44 and 45 of the mounting pins. Upon engagement of the pins 46 and 47 in the holes of lugs 42 and 43, the inner lid member 16 is mounted on the outer lid member 15 for pivotable movement with respect to the latter.

Movements of the inner lid member 16 relative to the outer lid member 15 are effected in response to pivotal movement of the outer lid member 15 relative to the housing 11 by means of follower pins 48 and 49 at the opposite ends of the free edge part 41A of the skirt portion 41. The follower pins 48 are slidably engageable in the cam or guide grooves 32 in the end walls 27 and 28. The illustrated shape of each of the cam or guide grooves 32 is selected to insure that the lower edge part 41A of the skirt portion 41 comes close to the lower edge of the front wall portion 33 only when the lid assembly 14 is approximately at its wholly closed position for avoiding any contact of the lid assembly with the tape run during movement of the opened and closed positions of the lid assembly.

In order to urge the lid assembly 14 to its closed position, the tape cassette 10 further includes a coil spring 57 associated with the pivot pin 38. While only one coil spring 57 is shown, it will be understood that a second coil spring is associated with the other pivot pin 39.

The tape cassette 10 further includes a latch element 64 mounted adjacent the end wall 19 of the housing 11. The latch element 64 had an engaged condition for lockiing the lid assembly 14 in its closed position and a releasing or disengaged position for permitting movement of the lid assembly to its opened position. The coil spring 57 is thus provided for urging the lid assembly 14 to its closed position but also acts on the latch element 64 when the housing portions 11A and 11B are assembled together for urging the latch element 64 to the engaged condition thereof.

The cassette 10 further includes a brake assembly which acts as a reel lock and includes a brake body 81 and a brake guide structure 82 in the housing 11 at a location between the reels 12A and 12B adjacent the side of the housing remote from the opening 22. The brake guide structure 82 operates to guide the brake body 81 in the fore and aft direction, that is, in a direction parallel to the plane of separation of the housing portions 11A and 11B. A pair of diverging, resilient, blade-like extensions project from the brake body 81 to the reels 12A and 12B, respectively, and are engaged with two peripheries, 84A and 84B, on the lower flanges 85A and 85B of the reels 12A and 12B respectively. A plate spring member 86 which is also installed in the housing urges the brake body 81 to its extended position.

With the cassette structure shown in FIG. 1, the assembly has a number of manufacturing steps. Accordingly, this invention is especially directed to the upper reel flanges 86A and 86B of the reel assemblies 12A and 12B for the cassette of FIG. 1.

Figure 2:
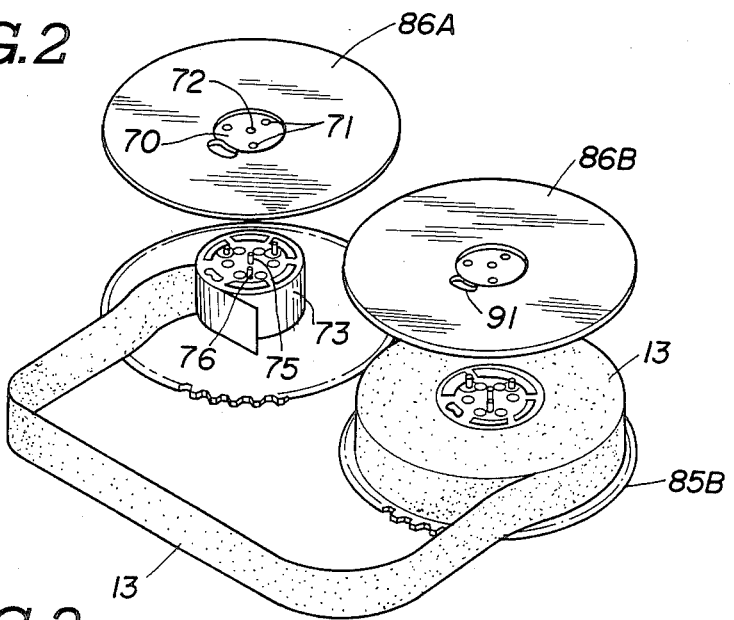
FIG. 2 is a perspective view of the components of a tape reel showing their connection.

In the example shown in FIG. 2, the upper reel flange 86A defines a plurality of openings 71 spaced about a centrally-located opening 72 in a recessed center portion 70. A coaxial cylindrical projecting portion 73, about which the tape 13 or a leader or trailer tape is secured to an end stopper 74, defines a plurality of upwardly directed pins 75 and 76 locatead so that the pin 75 is in register with the opening 72, while the pins 76 are in register with the openings 71. The upper reel flange is thus secured to the projecting portion 73 by engaging the respective pins and openings and securing them by heating or adhesive. With this structure, the tip of the pins which may protrude slightly beyond the plane of the recessed portion 70, but nevertheless do not extend beyond the surface plane of the reel flange.

Figure 3:
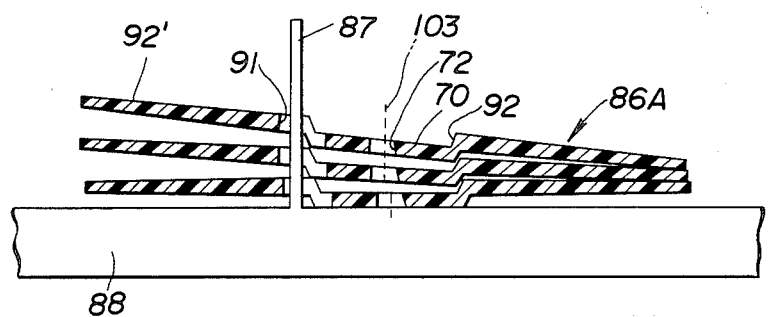
FIG. 3 is a side cross sectional view of a plurality of upper reel flanges stacked on a stacking pin and illustrating a skewing problem with prior flanges to which the upper reel flange according to the invention is structured to overcome.

However, as shown in FIG. 3, when the upper reel flanges are constructed as generally shown in FIG. 2, they have a tendency when stacked on a stacking pin 87 on a base mount 88 to skew one with respect to the other. This occurs because the upper reel flange 86A as explained defines a central recessed portion 70 defining a central axis 72 and an opening 91 for receiving the stacking pin 87. Because the size of the stacking pin opening 91 is relatively larger than the diameter of the stacking pin 87, the upper reel flanges 86A have some lateral movement capability which permits a shoulder 92 of one flange member 86A to nest within the shoulder of an adjacent flange member. When a stacked array of upper reel flanges 86A about a stacking pin 87 is so skewed, difficulties are encountered in the manufacturing process in moving individual upper reel flanges 86A from their stacked location to a predetermined assembly location for securing to the projection portion.

Figure 4:
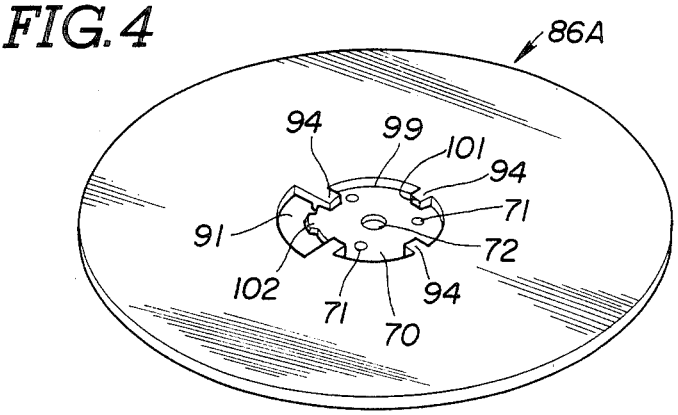
FIG. 4 is a top perspective view of an upper reel flange according to the invention showing the inwardly projecting plurality of ribs in the central recessed portion of the upper reel flange.

Accordingly, as shown in FIG. 4, this invention relates to such an upper reel flange 86A which includes a plurality of inwardly projecting ribs 94 each having an upper surface approximately planar with and contiguous to the adjacent annular extending portion 95 of the reel flange 86A.

The upper flange reel 86A is preferably made from a synthetic, clear resinous plastic. The recessed center portion 70 defines a centrally located axial recess 72 and a radially offset stacking pin receiving recess 91. A plurality of openings 71 are radially spaced about the center axial opening 72 for mating with the upwardly extending pins 75 and 76 on the coaxially extending cylindrical projection portion 73 as shown in FIG. 2. Thus, the opening 72 and the plurality of openings 71 provide rotational stability to the upper flange wheel mounted in the cassette. The recessed portion 70 is recessed to an extent sufficient to define a shoulder 99 having a dimensional thickness which is not greater of the thickness than the upper reel flange 86A at its central portion to cause a secure connection between the recessed portion 70 and the adjacent laterally extending annular portion 95. Preferably, the inwardly projecting ribs 94 have a thickness which is equal to the axial dimension of the shoulder 99 so that the innermost edge 101 of each of the projecting ribs 94 is of like thickness. However, if desired, the thickness of the rib edge portion 101 may have a dimension other than the thickness of the shoulder 99.

Figure 5:
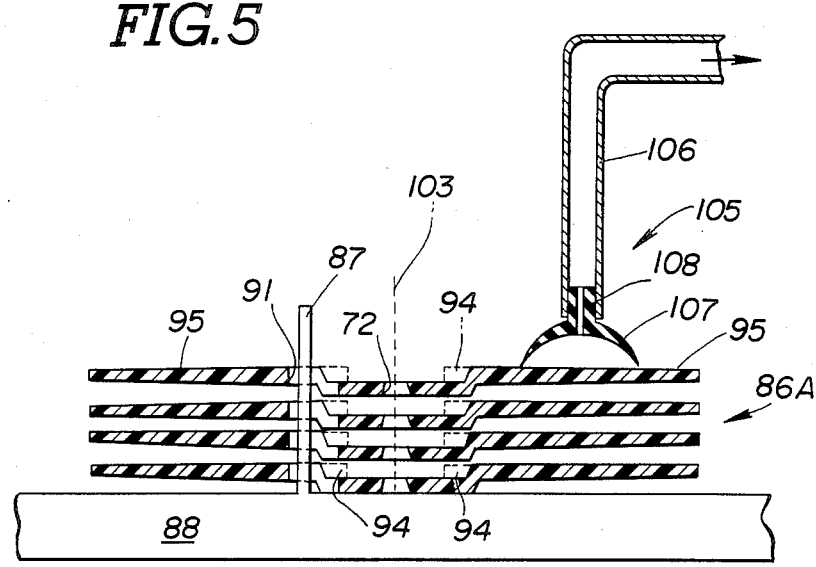
FIG. 5 is a view similar to FIG. 2 illustrating how the improved upper reel flanges according to the invention are maintained in a true vertical and horizontal stack during manufacturing for transfer from the stack by a vacuum transfer mechanism.

The ribs 94 preferably project radially-inwardly from the shoulder 99 toward the opening 72 to an extent sufficient to provide the stacking support discussed in connection with FIG. 5. The width of the ribs may vary.

The central recessed portion 70 further defines a radially-outwardly arcuately-shaped extending projection 102 traversing an inward portion of the pin receiving recess 91. That projection 102 further assists in locating the stacking pin 87 in the opening 91. While the recessed portion 70 and the annular extending flange 95 are preferably formed or molded as a unitary member during the plastic forming process, if desired, the central recessed portion 70 may be separate and secured to the annular flange 95.

The preferred embodiment illustrates four inwardly-projecting ribs 94 having the characteristics mentioned. However, fewer or greater than four ribs may also be utilized if desired. As shown in FIG. 5, the presence of the ribs 94 has a significant advantage in maintaining alignment of a plurality of upper reel flanges 86A when stacked according to the invention. Thus, a stacking mechanism comprises a base plate 88 and a stacking pin 87, as discussed in FIG. 3 for passing through the pin-receiving opening 91. Ideally, the upper reel flanges 86A are stacked in a way in which their center openings 72 are axially aligned along an axis designated by the reference numeral 103 so that a lowermost portion of the recessed portion abuts on and is supported by the spaced pluralilty of ribs 94 of the next adjacent member. In FIG. 5, a schematic view of a vacuum mechanism 105 is depicted having a conduit 106 connected to a vacuum source (not shown), the other end of which is connected to a resilient suction member 107 acting as a suction cup in communicating through an opening 108 with the vacuum conduit 106 and hence the source of vacuum. By contacting the suction cup 107 with a surface of the reel flange 86A and its annularly projecting portion 95, the flange 86A is caused to adhere by vacuum to the suction member 107 so that it may be lifted over the pin 87 and placed over the upwardly-extending pins on the coaxial cylindrical projection portion 73 intermediate the upper and lower reel flanges. When those projections are inserted through the openings formed in the central recess of the upper reel and the top end is heated and enlarged by melting to secure the upper reel flange to form the completed reel or adhesively secured, the melted or deformed upper end portion of the projection is located within the recess and thus does not project to the outside of the upper reel 7.

Figure 7:
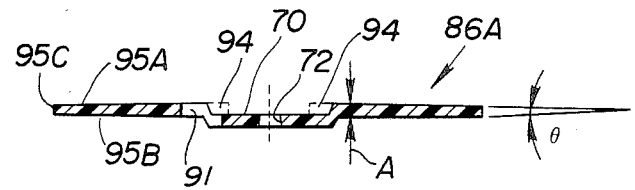
FIG. 7 is a side cross sectional view taken along line 6—6 of FIG. 6 depicting a decrease in the thickness of the annular extending portion of the reel flange with increasing distance from its center axis to further facilitate the withdrawal from the stack according to the method of FIG. 5.

In addition to the foregoing structure maintaining the alignment horizontally and vertically during the stacking process as shown in FIG. 7, a second advantage accrues from the structure according to the invention. Since the upper reel is made of a transparent plastic material, the fact that the shoulders 99 of the recessed portion 70 cannot slide radially relative to one another (compare FIG. 3 with FIG. 5), thus avoids conspicuous scratches and a potential for abraiding the shoulders 99 on the contacting portions between adjacent upper reel flanges.

Figure 6:
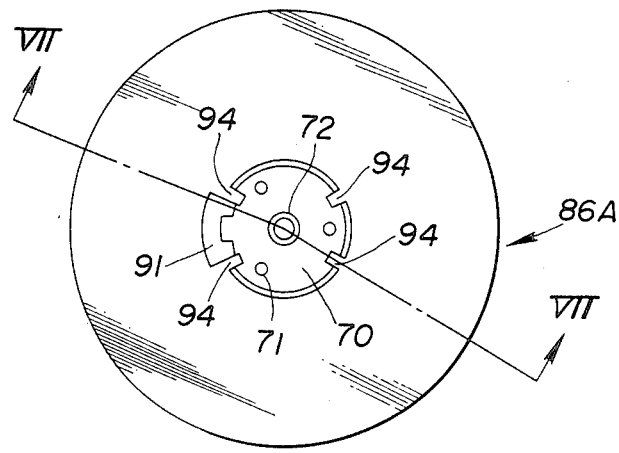
FIG. 6 is a top plan view of the upper reel flange according to the invention.

FIG. 6 is a plan view of the reel flange according to the invention which is also shown in cross section in FIG. 7 showing another aspect of the invention. Rather than the upper annular surface 95A and the lower annular projecting surface 95B extending horizontally to define a portion which is substantially uniform in thickness between its inner and outer radial edges, those surfaces define a slight taper designated by the angle $\theta$. Thus, the outermost edge 95C of an upper reel flange is thinner than the portion adjacent to the recessed portion designated by the thickness arrows A. Thus, the thickness of the reel flange and the annular portion decreases with increasing radial distance from the center. When the outermost portion of an upper reel flange is thinner, according to the relationship described, the spacing between adjacent outermost portions of reel flanges when stacked in accordance with FIG. 5 is greater than at the interior thereof, thus inhibiting vacuum contact between adjacent members and thus insuring that the reel flanges will be removed in the stacking process one at a time. In addition, material is saved and the winding and unwinding of tape about a reel thus formed is facilitiated since, in effect, a decreasing width channel is formed to guide the tape from the annularly remote portion of the reel to an annularly interior portion of the reel.

The invention may be embodied in other specific forms without departing from its spirit or essential charactertistics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A reel flange having a flange portion and a central recessed portion, for a magnetic tape cassette, comprising:
    a first substantially planar surface on a first side of the flange portion;
    a second substantially planar surface on a second side of the flange portion opposite to said first side;
    a third planar surface on a first side of the central recessed portion;
    a fourth planar surface on a second side of the central recessed portion opposite to said first side of the central recessed portion, said fourth planar surface being spaced from said first substantially planar surface by a distance greater than the distance between said first substantially planar surface and said second substantially planar surface;
    said first substantially planar surface including an inner edge having a first diameter, and said third planar surface including an outer perimeter having a second diameter, said second diameter being smaller than said first diameter;

a sloping surface connecting the inner edge of said first substantially planar surface to the outer perimeter of said third planar surface, said sloping surface and said third planar surface defining a recess;

said fourth planar surface including an outer edge having a third diameter, said third diameter being equal to or less than said first diameter of the inner edge of said first planar surface and equal to or greater than said second diameter of the outer perimeter of said third planar surface, whereby a like reel flange stacked upon said reel flange would tend to tilt; and projection means, projecting within said recess, for supporting an adjacent reel flange substantially parallel to said reel flange when the reel flanges are stacked.

2. The reel flange as set forth in claim 1, wherein said projection means comprises a plurality of projections integrally formed with said flange portion and projecting from said sloping surface.

3. The reel flange as set forth in claim 2, wherein each of said plurality of projections has a height essentially the same as that of other projections.

4. The reel flange as set forth in claim 3, wherein each of said plurality of projections has a top surface substantially flush with said first substantially planar surface.

5. The reel flange as set forth in claim 2, wherein at least one of said projections extends radially from said sloping wall.

6. The reel flange as set forth in claim 1, wherein said reel flange is also formed with an opening suitable for receiving a stacking member for vertical alignment of a plurality of reel flanges.

* * * * *